United States Patent

Hayashi et al.

[11] Patent Number: 5,900,296
[45] Date of Patent: May 4, 1999

[54] GLASS SUBSTRATE FOR MAGNETIC DISK

[75] Inventors: Ichiro Hayashi, Tokyo; Kei Maeda, Kawasaki; Kazuo Mannami, Yokohama, all of Japan

[73] Assignee: AG Technology Co., Ltd., Yokohama, Japan

[21] Appl. No.: 08/634,428

[22] Filed: Apr. 18, 1996

[30] Foreign Application Priority Data

Apr. 20, 1995 [JP] Japan ................................. 7-095474

[51] Int. Cl.$^6$ ..................................................... G11B 5/82
[52] U.S. Cl. ..................... 428/64.1; 428/64.2; 428/64.3; 428/64.4; 428/65.3; 428/694 ST; 428/410; 428/426; 501/55; 501/68; 501/69; 501/70; 501/72
[58] Field of Search .................. 428/64.1, 64.2, 428/64.3, 64.4, 65.3, 65.4, 65.5, 694 ST, 410, 426, 432, 446, 450; 501/53, 55, 68, 69, 70, 72

[56] References Cited

U.S. PATENT DOCUMENTS

| | | | |
|---|---|---|---|
| 3,900,329 | 8/1975 | Grubb et al. | 106/52 |
| 4,015,045 | 3/1977 | Rinehart | 428/410 |
| 4,053,679 | 10/1977 | Rinehart | 428/410 |
| 4,833,001 | 5/1989 | Kijima et al. | 428/141 |
| 5,091,345 | 2/1992 | Becker | 501/14 |
| 5,292,690 | 3/1994 | Kawachi et al. | 501/33 |
| 5,405,646 | 4/1995 | Nanis | 427/131 |
| 5,599,754 | 2/1997 | Maeda et al. | 501/70 |

FOREIGN PATENT DOCUMENTS

| | | |
|---|---|---|
| 49-039897 | 10/1974 | Japan . |
| 3-40933 | 2/1991 | Japan . |
| 3040933 | 10/1991 | Japan . |
| 7-257937 | 10/1995 | Japan . |
| 7257937 | 10/1995 | Japan . |
| 1 292 359 | 10/1972 | United Kingdom . |
| 1292539 | 10/1972 | United Kingdom . |
| 1 322 228 | 7/1973 | United Kingdom . |
| 1 499 716 | 2/1978 | United Kingdom . |
| 1 539 952 | 2/1979 | United Kingdom . |

OTHER PUBLICATIONS

Database WPI, Derwent Publications, AN 74–81856V/47, JP–A–74 039897, Oct. 29, 1974.

*Primary Examiner*—Stevan A. Resan
*Attorney, Agent, or Firm*—Oblon, Spivak, McClelland, Maier & Neustadt, P.C.

[57] ABSTRACT

A glass substrate for magnetic disks, obtained by chemical strengthening treatment of a glass consisting essentially of from 50 to 65 wt % of $SiO_2$, from 5 to 15 wt % of $Al_2O_3$, from 2 to 7 wt % of $Na_2O$, from 4 to 9 wt % of $K_2O$, from 7 to 14 wt % of $Na_2O+K_2O$, from 12 to 25 wt % of $MgO+CaO+SrO+BaO$, and from 1 to 6 wt % of $ZrO_2$.

5 Claims, No Drawings

GLASS SUBSTRATE FOR MAGNETIC DISK

BACKGROUND OF THE INVENTION

1. Field of the Invention

The present invention relates to a glass substrate for magnetic disks.

2. Discussion of the Background

A magnetic disk has a magnetic layer and a protective layer formed on a substrate by various processes including sputtering, plating, vapor deposition or the likes Generally, a glass is noteworthy as a magnetic disk substrate material suitable for highly densifying since it has an excellent surface smoothness, a satisfactory hardness and a high flow stress (resistance to deformation) and its surface defect is very few.

When a relatively cheap alkali-containing glass such as soda-lime silica glass is used as a glass substrate, it is known to corrode or discolor a magnetic film since an alkali ion is precipitated from a pinhole or peripheral part of a magnetic film or a glass-exposed part, particularly when it is under high moisture circumstances or it is subjected to aging treatment.

In order to avoid this problem, it may be proposed to use a glass of extremely low alkali content such as a non-alkali glass.

However, it is difficult to obtain a strength satisfactory for practical use when a non-alkali glass is used. It is because an ion exchange-strengthening treatment can not be carried out. Examples of strengthening treatments applied to a glass in order to obtain a strength satisfactory for practical use, include strengthening by air-cooling, ion exchange-strengthening, and the like, but in order to maintain a satisfactory flatness of a thin glass substrate for a disk, it is necessary to employ the ion exchange-strengthening treatment which can be conducted at a low temperature. The ion exchange-strengthening treatment is a treatment of exchanging an $Na^+$ ion in an Na-containing glass with a $K^+$ ion having a larger ion radius at a temperature not higher than the transition temperature of the Na-containing glass.

As mentioned above, it is an alkali content contained in a glass that is ion exchanged in the ion exchange-strengthening treatment, and therefore a non-alkali glass can not be subjected to the ion exchange-strengthening treatment. Thus, a substrate glass must be an alkali-containing glass in order to be subjected to the ion exchange-strengthening treatment at a low temperature.

As mentioned above, such properties of (1) not causing degradation of a magnetic layer under high moisture circumstances or during aging and (2) having a strength satisfactory for practical use, as demanded for a glass substrate for magnetic disks, are opposite properties, and it is difficult to satisfy the two properties at the same time.

SUMMARY OF THE INVENTION

An object of the present invention is to provide a glass substrate which can be subjected to ion exchange-strengthening treatment to obtain a satisfactory mechanical strength and which does not cause such a problem of conventional soda-lime glass as to corrode a magnetic metal film on a glass substrate.

The present invention has been made to solve the above-mentioned problems, and provides a glass substrate for magnetic disks, obtained by chemical strengthening treatment of a glass consisting essentially of from 50 to 65 wt % of $SiO_2$, from 5 to 15 wt % of $Al_2O_3$, from 2 to 7 wt % of $Na_2O$, from 4 to 9 wt % of $K_2O$, from 7 to 14 wt % of $Na_2O+K_2O$, from 12 to 25 wt % of $MgO+CaO+SrO+BaO$, and from 1 to 6 wt % of $ZrO_2$.

DETAILED DESCRIPTION OF THE PREFERRED EMBODIMENTS

Each component of the glass for the glass substrate of the present invention is explained hereinafter in more details.

$SiO_2$ is a network former of a glass, and it is contained in an amount of from 50 to 65 wt % in the glass of the present invention. If the amount of $SiO_2$ is too small, the chemical resistance of the glass is lowered, and if the amount of $SiO_2$ is too larger the glass tends to be hardly meltable. A preferable amount is from 52 to 62 wt %.

$Al_2O_3$ improves the chemical durability of the glass, and increases the ion exchanging rate of an alkali metal in the glass surface layer part with an alkali metal having a larger ion radius and has a function of accelerating formation of deep compressive stress. The amount of $Al_2O_3$ in the glass of the present invention is from 5 to 15 wt %, and if the amount of $Al_2O_3$ is too large, the glass becomes hardly meltable. A preferable amount is from 6 to 9 wt % and a more preferable amount is from 6 to 8 wt %.

$Na_2O$ has a function as a flux during melting a glass, and becomes the main component to be ion-exchanged during chemical strengthening treatment. The amount of $Na_2O$ in the glass of the present invention is from 2 to 7 wt %. If the amount of $Na_2O$ is too large, the chemical resistance of the glass is lowered and the corrosion resistance of a magnetic film tends to be lowered since a large amount of $Na^+$ ion is precipitated on the surface of the glass substrate.

The addition of $K_2O$ improves the ion exchanging rate during chemical strengthening treatment. By adding $K_2O$ in place of $Na_2O$, the amount of $Na_2O$ added can be reduced, and the corrosion resistance of a magnetic film can be improved. The amount of $K_2O$ in the glass of the present invention is from 4 to 9 wt %. However, if the amount of $K_2O$ is too large and the amount of $Na_2O$ becomes relatively too small, ion exchanging tends to be hardly caused. In view of the above point, the amount of $K_2O+Na_2O$ in the glass of the present invention is from 7 to 14 wt %.

MgO, CaO, SrO and BaO have functions as a flux during melting a glass, and-are added to accelerate the melting. In the present inventions these components are added in a total amount of from 12 to 25 wt %. If the total amount exceeds the above-mentioned range, the devitrification temperature of a glass becomes higher, and it becomes difficult to prepare a flat glass plate.

In order to make forming by float process easy, it is preferable to use HgO in an amount of from 0.5 to 5 wt %, CaO in an amount of from 2 to 8 wt % and MgO+CaO in a total amount of from 2.5 to 10 wt %. If the amounts of these components are too large, the liquids temperature becomes unsatisfactorily high, and the forming by float process tends to become hard. It is important to make the liquids temperature low to a certain level in order to secure a satisfactory processability by float process. Thus, since the forming by float process is conducted at a viscosity of about $10^4$ poises, the forming by float process becomes difficult unless the liquids temperature is lower than the glass temperature at which the viscosity becomes $10^4$ poises. Also, in the present inventions if the amount of CaO is too large, the chemical strengthening effect tends to be weak, as proved by the following experiment.

From the above-mentioned points of view, the amount of HgO is more preferably from 1 to 3 wt %, and the amount of CaO is more preferably from 2 to 5.5 wt %g most preferably from 3 to 5.5 wt %. Further, the total amount of HgO +CaO is preferably from 4 to 9 wt %.

In order to make the forming by float process easy, it is preferable to use SrO in an amount of from 4 to 10 wt %. If the amount of SrO is too large, the liquids temperature becomes unsatisfactorily high. The amount of SrO is more preferably from 6 to 9 wt %. Also, the amount of BaO is preferably from 5 to 12 wt %. If the amount of BaO is too large, the liquids temperature becomes unsatisfactorily high. The amount of BaO is more preferably from 6 to 11 wt %.

$ZrO_2$ has an effect of improving chemical durability The amount of $ZrO_2$ in the glass of the present invention is from 1 to 6 wt %. If the amount of $ZrO_2$ is too large, the meltability becomes poor. The amount of $ZrO_2$ is preferably from 2 to 5 wt %.

In addition to the above-mentioned components in order to improve meltability refinability and processability of glass, $As_2O_3$, $Sb_2O_3$, $P_2O_5$, F, Cl and $SO_3$ can be added to the glass substrate of the present invention in a total amount of not more than 2 wt %. Also, in order to improve the chemical durability of glass, $La_2O_3$, $TiO_2$, $SnO_2$ and ZnO can be added in a total amount of not more than 5 wt %. Further, the color tone of glass can be adjusted by adding a coloring material such as $Fe_2O_3$, CoO, NiO and $Nd_2O_3$. The coloring material is added preferably in a total amount of not more than 1 wt %. Also, alkali components such as $K_2O$ and $Na_2O$ may be partly replaced by a small amount of $Li_2O$, and the amount of $Li_2O$ is preferably not more than 1 wt %.

The glass of the present invention can be prepared, for example, by the following method. That is, starting materials of each component are blended so as to be aimed compositions and the blended starting materials are continuously charged into a melting furnace wherein they are heated at a temperature of from 1,500 to 1,600° C. to be melted. The melted glass is formed into a glass plate having a predetermined thickness by flow process, and is gradually cooled and is then cut.

The glass substrate of the present invention is obtained by subjecting the above prepared glass plate having a predetermined size to chemical strengthening treatment. The chemical strengthening treatment can be conducted by a well known method. That is, the chemical strengthening treatment can be conducted by dipping a glass product in molten potassium nitrate or a mixture of potassium nitrate and sodium nitrate at a temperature of from 400 to 530° C. for from 2 to 20 hours, taking the glass product out of the molten salt, and gradually cooling the glass product thus treated.

Also, texture processing for optionally forming a predetermined texture on a magnetic disk is carried out after etching, polishing and washing but before chemical strengthening treatment. The texture processing can be carried out by using a solution or vapor of hydrofluoric acid.

In order to obtain a magnetic disk by using the glass substrate of the present invention, an undercoat (primer) layer, a magnetic layer, a protective layer and a lubricant layer are formed on the glass substrate in this order.

For the ferromagnetic layer as a magnetic recording layer used in the present invention, a Co alloy series magnetic recording material such as a Co—Cr series, a Co—Cr—Pt series, a Co—Ni—Cr series, a Co—Ni—Cr—Pt series, a Co—Ni—Pt series, a Co—Cr—Ta series or the like is preferably used. For the undercoat layer formed below the ferromagnetic layer to improve the durability and the magnetic characteristics, an undercoat layer such as a Ni undercoat layer, a Ni—P undercoat layer, a Cr layer, a $SiO_2$ layer or the like may be formed.

In the present inventions a Cr layer, a Cr alloy layer, a metallic or alloy layer composed of another material having anti-corrosion characteristics may be formed on or below the ferromagnetic layer.

A carbon or silica layer having a thickness of from 50 to 1000 Å can be used as a protective layer, and a perfluoropolyether type liquid lubricant layer having a thickness of about 30 Å can be used as a lubricant layer.

EXAMPLES (Preparation of plate-like glass)

Each of four types of glass compositions No. 1 to No. 4 as shown in the following Table 1 was mixed and blended to prepare a glass batch in accordance with normal method. Thereafter, the glass batch was placed in a Pt-Rh 10% crucible having a volume of about 500 ml, and was melted at 1,500° C. for about 4 hours including about 1 hour-stirring for homogenization. The glass melt was then cast on a carbon plate to prepare a plate-like glass, and was gradually cooled. Thereafter, it was cut and polished in accordance with normal method to obtain a plate-like glass sample having a thickness of about 1 mm. An ordinary soda-lime silica glass was used as a comparative example (No. 5) as shown in the following Table 1. Liquids temperature, temperature providing $10^4$ poises, temperature providing $10^2$ poises and strain point of each of the glass samples thus obtained are shown in the following Table 1.

Each of the plate-like glass samples No. 1 to No. 5 was cut and polished to prepare 20 pieces of a doughnut-shaped glass disk substrate having an outer diameter of 65 mm, an inner diameter of 20 mm and a thickness of 0.635 mm.

(Strength test of glass substrate)

Thereafter, ten pieces of each of the above prepared glass disk substrates were subjected to chemical strengthening treatment. That is, the chemical strengthening treatment was conducted by dipping samples No. 1 to No. 4 in molten potassium nitrate salt at 480° C. for 10 hours and sample No. 5 in molten potassium nitrate salt at 450° C. for 10 hours.

Each of the glass disk substrates thus treated, was measured in respect of a thickness of a surface compressive stress layer by means of a main surface stress measuring device FSW-60 manufactured by Toshiba Glass Company, and the results are shown in the following Table 1. Also, another sample No. 1 was separately dipped in molted potassium nitrate salt at 500° C. for 10 hours to conduct chemical strengthening treatment, and as this result, a thickness of a surface compressive stress layer was 20 μm.

As can be seen from the results shown in the following Table 1, each of the glass substrates of the examples of the present invention has a surface compressive stress layer of at least 10 μm and the samples containing CaO in an amount of less than 5.5 wt % have a surface compressive stress layer of at least 14 μm. Thus, in the case of conducting the chemical strengthening treatment under the same conditions, the depth of a compressive stress layer becomes deeper and the chemical strengthening tends to become stronger if the CaO content in the glass of the present invention becomes smaller. As mentioned above, it is preferable for the glass of this invention to contain calcium oxide of 2 to 5.5 wt %.

Ten pieces of each of unstrengthened glass substrate disks and strengthened glass substrate disks were subjected to bending strength test by supporting the whole outer periphery of disk and applying a load to the inner periphery of disk, and an average strength was measured. As this result, the bending strength of unstrengthened sample No. 5 was 12.0 kg/mm², while the bending strength of strengthened sample No. 5 having a compressive stress layer of 20 μm in depth was 34.1 kg/mm². On the other hand, the bending strength of unstrengthened samples Nos. 1 to 4 was 15.5 kg/mm², while the bending strength of strengthened sample No. 1 having a compressive stress layer of 20 μm in depth was 43.6 kg/mm².

As evident from the results of the above examples, chemical strengthening treatment can be applied to the glass substrate of the present invention at the same or more satisfactory level as compared with a conventional soda-lime silica glass substrate, and the strength of the strengthened product is equal or higher than that of the conventional soda-lime silica glass substrate. Thus, it is recognized that the glass substrate of the present invention has a satisfactory strength sufficient for practical use as a magnetic disk substrate. This is supported also by the fact that the above bending strength of the glass substrate of the present invention is much higher than the yield strength of 10 kg/mm$^2$ of aluminum widely used as a magnetic disk substrate at present.

(Moisture resistance test of magnetic recording medium)

A magnetic recording medium was obtained by forming a primer coating layer of about 500 Å thickness comprising Cr on the main surface of each of the above prepared unstrengthened products and strengthened products by sputtering, forming a Co-30 atom % Ni alloy magnetic layer of about 600 Å thickness thereon, forming a carbon protective layer of about 300 Å thickness further thereon, and then coating a perfluoropolyether type liquid lubricant thereon.

The samples thus obtained were subjected to moisture resistance test by maintaining them in an atmosphere of 80° C. and 90% RH for 100 hours. As this results the unstrengthened magnetic recording medium of sample No. 5 glass substrate was discolored in the range of from 2 to 3 mm from the end part of the inner periphery and the outer periphery of the disk from the boundary between the Co—Ni alloy layer and the glass to the inside, while the strengthened magnetic recording medium of sample No. 5 glass substrate was discolored in the range of from 1 to 2 mm in the same manner as above. On the other hand, all of both unstrengthened and strengthened magnetic recording media of samples Nos. 1 to 4 did not cause any disscoloration.

TABLE 1

|  | No. 1 | No. 2 | No. 3 | No. 4 | No. 5 |
|---|---|---|---|---|---|
| $SiO_2$ | 58.0 | 58.1 | 63.0 | 57.0 | 72.5 |
| $Al_2O_3$ | 7.0 | 7.7 | 8.0 | 6.0 | 1.5 |
| $Na_2O$ | 4.2 | 3.1 | 6.0 | 5.0 | 13.5 |
| $K_2O$ | 6.3 | 8.3 | 4.0 | 7.0 | 0.5 |
| MgO | 2.0 | 4.1 | 0.5 | 1.0 | 4.0 |
| CaO | 4.8 | 2.6 | 6.0 | 4.0 | 8.0 |
| SrO | 6.9 | 9.3 | 4.0 | 5.0 | — |
| BaO | 7.9 | 5.2 | 7.0 | 12.0 | — |
| $ZrO_2$ | 2.9 | 1.6 | 1.5 | 3.0 | — |
| $Fe_2O_3$ | 0.1 | — | — | 0.05 | 0.1 |
| Liquidus temperature (° C.) | 1070 | 1100 | 1120 | 1050 | 980 |
| Temperature at $10^4$ poises (° C.) | 1145 | 1166 | 1147 | 1099 | 1040 |
| Temperature at $10^2$ poises (° C.) | 1545 | 1582 | 1600 | 1505 | 1460 |
| Strain point (° C.) | 570 | 586 | 560 | 544 | 510 |
| Depth of compressive stress layer (μm)* | 15 | 18 | 13 | 17 | 20 |
| Discoloration by moisture-resistant test** | Nil | Nil | Nil | Nil | Discolored |

*Chemical strengthening treatment conditions;
No. 1–4 480° C., 10 hours,
No. 5 450° C., 10 hours
**Moisture-resistant test conditions;
80° C., 90% RH, 100 hours As mentioned above, the glass substrate of the present invention having a high strength for a magnetic disk is excellent in respect of corrosion resistance and aging resistance as compared with a conventional soda-lime silica glass substrate. Also, the glass substrate of the present invention achieves a satisfactory effect by ion exchange strengthening and provides a satisfactory mechanical strength sufficient for practical use. Further, the magnetic disk glass substrate of the present invention can be suitably formed by float process. Also the substrate glass of the present invention is excellent in processability and the polishing rate of the substrate glass of the present invention is 15 to 55% higher than an ordinary soda-lime glass. For example, when polishing by means of a both side-abrading device provided with a cast iron lapping plate by using an alumina-zirconia type No. 1500 abradant under a pressure of 60 g/cm$^2$, the thickness change of soda-lime silica glass was 3.78 μm/minute, while the thickness change of the glass of Example No. 1 was 4.35 μm/minute. Also, when polishing by means of a both side-abrading device provided with a foamed polyurethane pad impregnated with cerium oxide under a pressure of 100 g/cm$^2$, the thickness change of soda-lime silica glass was 0.74 μm/minute, while the thickness change of the glass of Example No. 1 was 1.15 μm/minute. Thus, the substrate glass of the present invention is advantageous also in respect of productivity.

Still further, since the CaO content in the glass substrate of the present invention is relatively small, CaO is hardly dissolved in molten potassium nitrate salt used in chemical strengthening treatment, and the life of the molten potassium nitrate salt used in chemical strengthening treatment can be extended.

We claim:

1. A glass substrate for magnetic disks, obtained by chemical strengthening treatment of a glass produced by a float process consisting essentially of from 50 to 65 wt % of $SiO_2$, from 5 to 9 wt % of $Al_2O_3$, from 2 to 7 wt % of $Na_2O$, from 4 to 9 wt % of $K_2O$, from 7 to 14 wt % of $Na_2O+K_2$, from 0.5 to 5 wt % of MgO, from 2 to 8 wt % of CaO, from 2.5 to 10 wt % of MgO+CaO, from 4 to 10 wt % of SrO, from 5 to 12 wt % of BaO, and from 1 to 6 wt % of $ZrO_2$, wherein said chemical strengthening treatment is carried out by immersing the glass in potassium nitrate, sodium nitrate or a mixture thereof at a temperature of from 400 to 530° C. for from 2 to 20 hours.

2. The glass substrate for magnetic disks according to claim 1, which has a compressive stress layer having a thickness of at least 10 μm below the glass surface.

3. The glass substrate for magnetic disks according to claim 1, which is obtained by chemical strengthening treatment of a glass consisting essentially of from 50 to 65 wt % of $SiO_2$, from 5 to 9 wt % of $Al_2O_3$, from 2 to 7 wt % of $Na_2O$ from 4 to 9 wt % of $K_2O$, from 7 to 14 wt % of $Na_2O+K_2O$, from 0.5 to 5 wt % of MgO, from 2 to 5.5 wt % of CaO, from 2.5 to 9 wt % of MgO+CaO, from 4 to 10 wt % of SrO, from 5 to 12 wt % of BaO, and from 1 to 6 wt % of $ZrO_2$.

4. The glass substrate for magnetic disks according to claim 3, which has a compressive stress layer having a thickness of at least 14 μm below the glass surface.

5. A magnetic memory medium comprising a glass substrate as defined in claim 1.

* * * * *